Patented Dec. 17, 1940

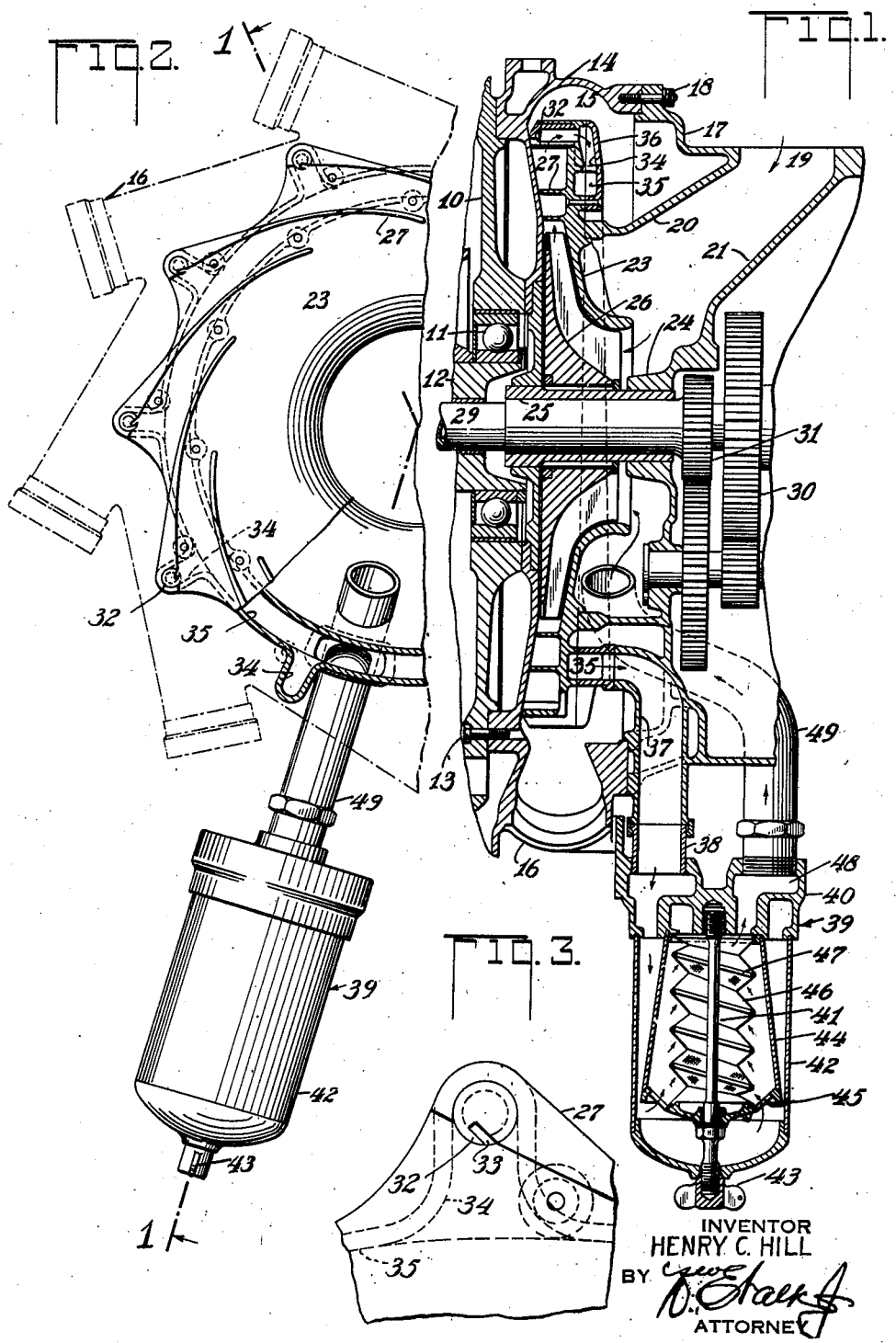

2,225,112

UNITED STATES PATENT OFFICE 2,225,112

AIR CLEANER

Henry C. Hill, Paterson, N. J., assignor to Wright Aeronautical Corporation, a corporation of New York Application July 9, 1938, Serial No. 218,265

8 Claims. (Cl. 183—36)

This invention relates to air cleaners for the induction systems of internal combustion engines, and more particularly comprises an intake air cleaning organization for supercharged aircraft engines.

It is well known that a considerable amount of dust and solid matter is inducted into internal combustion engines during operation, and in automobile and small aircraft engines, as well as industrial power plants, air cleaners comprising screens or metal wool have been placed over the engine air intake for the purpose of entrapping solid matter so that it may not enter the engine and cause contamination of the lubricant and premature wear of the engine parts. Where the rate of air induction is relatively small, the whole body of intake air may be passed through a filter which naturally causes a pressure drop having a slight tendency to reduce the amount of air consumed by the engine. In order to make air cleaners efficient, they must be of considerable bulk and weight which can be ill afforded in aircraft engines, and which are inconvenient when engines of any type are of large size. In the development of aircraft engines to high powers, a vast amount of air is consumed, and if a screen or wool cleaner were to be applied to these large engines, their bulk becomes so great that their utility is offset.

It is an object of this invention to provide an efficient air cleaning organization for large engines wherein the essential air cleaning is accomplished either centrifugally or by effecting a change in direction of the air flow so that foreign matter in the air may be flung against a housing which is provided with projections to collect the foreign matter.

A further object is to provide means for bleeding a small part of the intake air through suitable passages adjacent those projections which catch foreign matter, in order that the foreign matter may continually be washed from the intake system.

In the case of supercharged aircraft engines in which the supercharger is disposed between the carburetor and the engine, the invention provides means for circulating the air bleed through a dust collecting trap and back into the intake of the supercharger. This is desirable, since that air which enters the supercharger from the carburetor is charged with fuel; that air bleed which washes solid matter from the system is likewise charged with fuel, and accordingly it is desirable to return the air bleed and its fuel to the engine induction system in order to conserve the fuel carried thereby.

A further object of the invention is to provide a recirculating air bleed system, the initial function of the air bleed being to wash foreign matter from the induction system to a collecting unit, the air bleed thence returning, clean, to the engine system.

A further object of the invention is to provide an air cleaning organization which may be incorporated in existing engine designs without unduly changing the component parts thereof.

Another object is to provide an air cleaner incorporated in the diffuser of a supercharger, along with means for washing collected foreign matter from the diffuser into a suitable trap.

Still another object is to utilize the pressure rise across an engine supercharger for inducing air flow through an aircleaner and a collecting trap, the proportion of air passing through the cleaner and trap being small with respect to the total air flow through the supercharger.

Still another object is to provide an air cleaning organization in which there is no possibility of stopping or reducing the intake air flow to the engine regardless of the amount of foreign matter which may have accumulated in the air cleaning system.

Further objects will be apparent from a reading of the specification and claims, together with an examination of the accompanying drawing, in which:

Fig. 1 is a longitudinal section through the supercharger of an engine including the air cleaner and its ducts appropriate to the invention, comprising a section on the line 1—1 of Fig. 2;

Fig. 2 is a fragmentary elevation, partly in section, of the supercharger diffuser; and Fig. 3 is an enlarged fragmentary elevation of a portion of the supercharger diffuser.

In referring to the drawing, 10 represents the rear bearing diaphragm of an engine within which is mounted a bearing 11 in which the rear portion of a crankshaft 12 is journaled. To the bearing diaphragm 10 is bolted, as at 13, a member 14 defining a duct 15 communicating with air outlets 16 which are connected by conventional induction pipes to the several engine cylinders, not shown. To the member 14 a housing 17 is bolted as at 18, this housing carrying an air intake duct 19 defined by webs 20 and 21, the web 20 carrying a diffuser plate 23, and the web 21 carrying a bearing 24 within which a supercharger impeller shaft 25 is journaled. This shaft is hollow, and to the exterior thereof is splined an impeller 26 communicating at its inner end with the duct 19, and at its outer end with passages defined by diffuser vanes 27 integral with the plate 23.

In Fig. 1 is indicated a crankshaft extension shaft 29, passing through the hollow of the impeller shaft 25, and driving a gear train 30 meshing with a pinion 31 mounted upon the shaft 25. Thus, the impeller is driven at high speed with respect to the crankshaft 12 in the conventional manner.

The diffuser vanes 27, as shown, are slightly curved according to conventional practice. It has been found in disassembling diffusers of this character on conventional engines, that the inner surfaces of the vanes are scrubbed clean by the washing action of air, foreign matter, and unvaporized fuel, whereas the outer surfaces of the vanes carry a slight coating which, in operation, slowly accumulates. This indicates that foreign matter and raw fuel is thrown outwardly against the inner surfaces of the vanes and accordingly, I have provided projections 32 which define slots 33 extending beyond the normal profile of the inner face of the vanes 27. Foreign matter, raw fuel, and a small amount of air, enters the slots 33 and are carried through passages 34 to an annular passage 35 formed in a member 36 riveted to the diffuser plate 23. The annulus 35 leads through a conduit 37 and through a fitting 38 attached to a trap 39 mounted upon the engine, the trap 39 comprising a cored fitting 40 into which is screwed a rod 41, to which rod in turn a cover 42 is detachably secured by a wing nut 43. Dust laden air passes into the space defined by the cover 42 and passes upwardly around a baffle 44, through holes 45 in the bottom of the baffle, to a screen unit 46 which, as shown, comprises a cloth bag held in expanded position by a spring 47. The interior of the bag 46 communicates with a passage 48 connected to a conduit 49 leading to the intake zone 19 of the supercharger, whereat low pressure exists. In the operation of the system, it will be seen that the supercharger impeller 26 draws air through a carburetor mounted adjacent the intake passage 19, increasing the velocity of the air, which velocity is converted to pressure head by the diffuser vanes 27. In the travel of intake air through the diffuser, the bulk of the air, with its fuel charge, passes directly to the engine while solid matter is centrifuged against the inner faces of the vanes 27 to be collected by the projections 32. Any accumulation of solid matter is washed through the passages 34 and 35 to the trap unit 39 wherein the dust is collected, the air bleed continuing through the dust collector back to the supercharger eye.

At periodic intervals, the wing nut 43 may be unscrewed and the trap unit 39 removed from the engine for cleaning, but regardless of whether the trap unit becomes loaded with foreign matter or not, there is no suppression of air supply to the engine as is the case with conventional air cleaners through which the whole air supply to the engine must pass.

It will be appreciated that in applying the principles of this invention to superchargers, the projections 32 may be disposed in other parts of the system, at any suitable place where a sharp change in direction of air flow takes place, under which conditions, foreign matter in the air, or any matter heavier than the air, is centrifugally separated therefrom.

If a supercharger be disposed on the intake side of the carburetor, it would be unnecessary to recirculate the air bleed back to the intake system, in which case a return duct, such as the duct 49, may be eliminated, the air bleed then discharging into the atmosphere or into some pressure zone whereat the absolute pressure is less than the absolute pressure existing at the point where the air bleed is taken from the system.

The amount of air bleed from the induction system may be readily adjusted either by varying the size of the slots 33 or by throttling the area of the passages 37 or 49. The air bleed should be the minimum necessary to effect adequate cleaning of foreign matter from the system.

I have shown a particular form of trap for foreign matter in Fig. 1 of the drawing, but it will be obvious that any trap might be adapted to the system without a change in the principles of operation thereof. The essential air cleaning is accomplished, as shown, in the diffuser, whereas the trap 39 merely comprises means for separating foreign matter from a small proportion of the induced air.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination in an engine having a supercharger including an inlet duct leading from a carburetor and a discharge duct leading to the engine, of an air bleed conduit from said discharge duct to said inlet duct, and an air cleaning filter in said conduit for removing foreign matter from the fuel-air mixture while conserving the fuel therein.

2. In a centrifugal air cleaner, a diffuser comprising curved vanes having hollows in the vane ends and slots transverse to the path of airflow communicating with said hollows, said slots being arranged to catch solid matter in air passing between the vanes, and a conduit connecting said hollows providing a bleed for solid matter trapped in said hollows.

3. In a centrifugal air cleaner, a housing carrying curved diffuser vanes, an impeller within the vanes producing airflow between the vanes, projections on the vanes to entrap solid matter from air passing between vanes, and means to convey entrapped solid matter from the air cleaner.

4. In an engine supercharger for fuel-air mixture a driven impeller, a diffuser plate at one side thereof having a plurality of circumferentially spaced spirally curved diffuser vanes thereon between which gas delivered by the impeller is adapted to pass, and projections across the concave sides of the diffuser vanes comprising catch devices for foreign matter hurled centrifugally against said vanes by the impeller, said vanes and projections having openings leading from the diffuser to bleed the mixture from the diffuser in company with foreign matter caught by the projections, a conduit connecting to said openings and leading to the impeller intake to recirculate the fuel-air mixture thereto, and a filter in said conduit to separate the foreign matter from mixture bled from the diffuser.

5. In an engine supercharger, including an impeller, a diffuser embracing the impeller comprising hollow ended spiral circumferentially disposed diffuser vanes between which air is delivered by the impeller, the concave sides of said vanes having projections and openings on the upstream side thereof communicating with the vane hollows, and a manifold connecting the several vane hollows, said projections with the adjacent openings comprising slotted cylindrical plugs set into said vane hollows.

6. In an engine supercharger system comprising a housing having a main inlet and a main outlet, a rotatable impeller therein for boosting the pressure of the working fluid entering through the outlet, a diffuser embracing the impeller having restricted fluid bleed openings in those parts thereof over which the working fluid flows, a manifold connecting said bleed openings leading through the housing and opening to the exterior thereof, a duct leading from the zone of the impeller intake through said housing and opening to the exterior thereof at a point close to the manifold opening, and a unitary filter detachably secured to the housing having inlet and outlet openings registering respectively with said manifold and duct openings.

7. In an engine supercharger system comprising a housing having an inlet leading from a carburetor, an impeller in the housing for boosting the pressure of the working fluid fed from said carburetor, a diffuser into which the impeller feeds the fluid, a main outlet for working fluid in the housing, said diffuser comprising vanes having catch slots thereon for removing foreign matter which passes over the vane surfaces with the working fluid, and said catch slots serving to remove with the foreign matter a small proportion of the working fluid, adjacent ducts in the housing both opening at their outer ends to the exterior of the housing and opening at their inner ends respectively to the catch slots and to the intake side of the impeller, and a readily detachable unitary trap for foreign matter secured to the housing and communicating with the outer ends of said ducts, said trap being organized to permit of relatively free flow of working fluid therethrough for recirculation to the impeller intake while precipitating any foreign matter.

8. In a centrifugal pump system adapted for pumping a gaseous fluid carrying solid impurities, a housing, a pump impeller therein, said housing having intake and delivery openings for the working fluid and having auxiliary relatively small, adjacent openings, one being connected interiorly of the housing to the intake side of the impeller, a series of hollow slotted vanes embracing the impeller and carried by the housing with the hollows of which the other of said small openings is in direct communication, and a unitary trap for solid impurities detachably secured to the housing and having passages registrable upon assembly with said auxiliary small openings.

HENRY C. HILL.